(12) United States Patent
Hong et al.

(10) Patent No.: US 8,375,257 B2
(45) Date of Patent: Feb. 12, 2013

(54) ECC CONTROL CIRCUITS, MULTI-CHANNEL MEMORY SYSTEMS INCLUDING THE SAME, AND RELATED METHODS OF OPERATION

(75) Inventors: Ju-Hyung Hong, Gyeonnggi-do (KR); Kwang-Seok Im, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1210 days.

(21) Appl. No.: 12/196,012

(22) Filed: Aug. 21, 2008

(65) Prior Publication Data

US 2009/0055713 A1 Feb. 26, 2009

(30) Foreign Application Priority Data

Aug. 21, 2007 (KR) ........................ 10-2007-0084143

(51) Int. Cl.
*G06F 11/00* (2006.01)
(52) U.S. Cl. ............................... 714/52; 714/48; 714/6.1
(58) Field of Classification Search .................... 714/52, 714/25, 42, 48, 2, 6.1
See application file for complete search history.

(56) References Cited

U.S. PATENT DOCUMENTS

| 2003/0156473 A1* | 8/2003 | Sinclair et al. ................ 365/200 |
| 2006/0069977 A1* | 3/2006 | Maeda et al. .................. 714/752 |
| 2007/0283217 A1* | 12/2007 | Gorfajn et al. ................ 714/758 |

FOREIGN PATENT DOCUMENTS

| JP | 05-233526 | 9/1993 |
| JP | 09-282228 | 10/1997 |
| JP | 2004-171106 | 6/2004 |
| JP | 2004-178122 | 6/2004 |

\* cited by examiner

*Primary Examiner* — Scott Baderman
*Assistant Examiner* — Sarai Butler
(74) *Attorney, Agent, or Firm* — Myers Bigel Sibley & Sajovec, P.A.

(57) ABSTRACT

An Error Correcting Code (ECC) control circuit in a memory controller includes an ECC controller configured to receive data from a memory device in response to a request from a host device. The ECC controller transmits the data to a direct memory access (DMA) buffer for transfer to the host device, and to an ECC block for error detection and correction of the data. The ECC controller is configured to interrupt transmission of the data to the DMA buffer and transmit error-corrected data output from the ECC block to the DMA buffer responsive to detection of an error in the data by the ECC block. Related systems and methods are also discussed.

29 Claims, 5 Drawing Sheets

ECC CONTROL CIRCUITS, MULTI-CHANNEL MEMORY SYSTEMS INCLUDING THE SAME, AND RELATED METHODS OF OPERATION

CROSS-REFERENCE TO RELATED APPLICATIONS

This U.S. non-provisional patent application claims priority under 35 U.S.C. §119 to Korean Patent Application No. 10-2007-0084143 filed on Aug. 21, 2007, the entire contents of which are incorporated herein by reference.

FIELD OF THE INVENTION

The present invention disclosed herein relates to data storage devices, and more particularly, to detecting and correcting data stored in memory devices.

BACKGROUND OF THE INVENTION

In an era when lower data rates and smaller data volumes (or sizes) were required by users, a single storage unit may have been sufficient to accommodate all of a user's data needs. But, in recent years, reducing data reading/writing periods and/or securing larger-capacity storage spaces have become important, for instance, in order to process larges quantities of multimedia data and/or real-time data. In particular, the physical limitations of storage materials may make it difficult to achieve high frequency operations and/or larger capacities for single storage units. To overcome such limitations, multi-channel memory systems have been proposed, which include a plurality of similar and/or different memory devices coupled to one another.

Today, various kinds of memory devices may be used as storage units, e.g., hard disk drives (HDDs) configured to store and read data by rotating aluminum disks coated with magnetic materials, optical disks, such as CD-ROMs or digital versatile disks (DVDs) configured to store information such as voice, images, or characters, and/or nonvolatile memories, such as flash memories.

Some such memory devices may frequently encounter errors or malfunctions while reading data, for example, due to the physical limitations thereof. For example, in hard disk drives, closer track spacing, the use of weaker signals to avoid interference, and/or increased rotation speeds may be used to meet ever-increasing storage demands. However, as the limits of such technologies are pushed, errors may occur more frequently. Furthermore, errors and/or failures in the hard disks may be caused by particles floating therein, electrostatic discharge (ESD), temperature, and/or humidity related effects while reading data therefrom.

Flash memories are nonvolatile devices that may retain data even without a power supply. Although not as fast as dynamic memories that may be used as main memories in personal computers, flash memory devices may offer advantages over hard disks in reading rate and/or resistance to external impact. As such, flash memories may be employed in mobile or portable devices that are operated by batteries. Another advantage of flash memory may be durability.

Flash memory may be used as nonvolatile storage units for computing systems, and may be capable of electrically erasing and rewriting data. In contrast to electrically erasable and programmable read-only memories (EEPROMs), flash memories may erase and/or write data in units of blocks and/or sectors. Due to lower costs than EEPROMs, flash memory may be used in applications that require large-capacity, nonvolatile, solid-state storage units. Typically, flash memory may be used in digital music players, digital cameras, and/or mobile phones. Moreover, flash memory may be used in universal serial bus (USB) drives for storing and transferring data between computing systems.

In a flash memory device, data may be retained in a memory cell array formed of floating gate transistors called memory cells, each of which stores bit information. For a single-level-cell (SLC) flash memory device, data stored in a unit memory cell may be sensed based on threshold voltage distributions corresponding to respective data states '1' and '0'. For example, when a reference voltage is applied to a control gate of the memory cell, the data ('1' or '0') stored in the cell may be determined based on current flow through the memory cell. However, since the actual threshold voltage distributions of the memory cells may not be within designed voltage ranges, errors may result from data readings. This phenomenon may become more serious, for example, due to charge loss or leakage, time lapse, temperature elevation, capacitive coupling by programming adjacent memory cells, reading adjacent memory cells, cell defects, and so forth.

SUMMARY OF THE INVENTION

According to some embodiments of the present invention, an Error Correcting Code (ECC) control circuit in a memory controller includes an ECC controller configured to receive data from a memory device in response to a request from a host device. The ECC controller is configured to transmit the data to a direct memory access (DMA) buffer for transfer to the host device, and to an ECC block for error detection and correction of the data. The ECC controller is configured to interrupt transmission of the data to the DMA buffer and transmit error-corrected data output from the ECC block to the DMA buffer responsive to detection of an error in the data by the ECC block.

In some embodiments, the ECC control circuit may further include the DMA buffer. The ECC controller may include a plurality of ECC blocks corresponding to respective ones of a plurality of memory devices and configured to perform error detection and correction of respective data read from the corresponding ones of the plurality of memory devices, and output respective error detection signals and respective error-corrected data; and a plurality of selectors corresponding to respective ones of the plurality of ECC blocks and configured to provide the respective data read from the corresponding ones of the plurality of memory devices to the DMA buffer and the corresponding ones of the plurality of ECC blocks in parallel. Each of the plurality of selectors may be configured to provide the DMA buffer with the respective error-corrected data from the corresponding one of the plurality of ECC blocks, instead of the data from the corresponding one of the plurality of memory devices in response to receiving the respective error detection signal from the corresponding one of the plurality of ECC blocks.

In other embodiments, the ECC block may be configured to generate an error detection signal responsive to detection of the error in the data from the memory device.

In some embodiments, the ECC controller may further include a selector configured to provide the DMA buffer with the error-corrected data from the ECC block in response to the error detection signal.

In other embodiments, the selector may be configured to provide the DMA buffer with the data from the memory device when the error detection signal is not received.

In some embodiments, the ECC block may include an ECC memory to store the data of the memory device.

In other embodiments, the ECC block may be configured to perform error correction on the data stored in the ECC memory and output the error-corrected data responsive to detection of the error in the data from the memory device.

In some embodiments, the ECC block may be further configured to output information including error location and/or status responsive to detection of the error in the data from the memory device.

According to other embodiments of the present invention, a memory system includes: a plurality of memory devices; and a memory controller configured to control the plurality of memory devices. The memory controller includes: a buffer memory; a direct memory access (DMA) buffer configured to transfer data to the buffer memory; a plurality of Error Correcting Code (ECC) blocks corresponding to respective ones of the plurality of memory devices and configured to perform error detection and correction of respective data read from the corresponding ones of the plurality of memory devices and output respective error detection signals and respective error-corrected data; and a plurality of selectors corresponding to respective ones of the plurality of ECC blocks and configured to provide the respective data from the corresponding ones of the plurality of memory devices to the DMA buffer and the corresponding ones of the plurality of ECC blocks. Each of the plurality of selectors is configured to provides the DMA buffer with the respective error-corrected data from the corresponding one of the plurality of ECC blocks instead of the data from the corresponding one of the plurality of memory devices in response to receiving the respective error detection signal from the corresponding one of the plurality of ECC blocks.

In some embodiments, each of the plurality of ECC blocks may be configured to generate the respective error detection signal responsive to detection of an error in the respective data from the corresponding one of the plurality of memory devices.

In other embodiments, each of the plurality of ECC blocks may be configured to correct the error in the respective data from the corresponding one of the plurality of memory devices based on respective ECC data included in the respective data from the corresponding one of the plurality of memory devices.

In some embodiments, each of the plurality of selectors may be configured to provide the DMA buffer with the respective error-corrected data output from the corresponding one of the plurality of ECC blocks in response to the respective error detection signal output therefrom.

In other embodiments, each of the plurality of selectors may be configured to provide the DMA buffer with the respective error-corrected data output from the corresponding one of the plurality of ECC blocks in response to the respective error detection signal output therefrom until transmission of the respective data including the error therein is completed.

In some embodiments, the DMA buffer may be configured to receive the respective data from the plurality of selectors and the respective error detection signals from the plurality of ECC blocks, and may be configured to transfer the respective data to the buffer memory when the respective error detection signals are not received from the corresponding ones of the plurality of ECC blocks.

In other embodiments, the DMA buffer may include a manager configured to transfer the respective error-corrected data from the plurality of selectors to the buffer memory in response to the respective error detection signal.

In some embodiments, the memory system may further include a memory interface coupled to the plurality of ECC blocks and configured to interface with the plurality of memory devices.

In other embodiments, each of the plurality of ECC blocks may respectively include an ECC memory configured to store the data from the corresponding one of the plurality of memory devices.

In some embodiments, each ECC block may be configured to perform error correction for the respective data stored in the respective ECC memory in response to detection of an error in the respective data from the corresponding one of the plurality of memory devices and output the respective error-corrected data.

In other embodiments, each ECC block may be further configured to output respective information including error position and/or status to the DMA buffer in response to detection of an error in the data from the corresponding one of the plurality of memory devices.

In some embodiments, the DMA buffer may include a manager configured to transfer the respective error-corrected data from the plurality of selectors to the buffer memory in response to the respective error detection signal and based on the respective information including error position and/or status.

According to further embodiments of the present invention, a method for correcting errors in data transmission includes receiving data from a memory device in response to a request from a host device. The data is transmitted to a direct memory access (DMA) buffer for transfer to the host device, and to an Error Correcting Code (ECC) block for error detection and correction of the data. Transmission of the data from the memory device to the DMA buffer is interrupted and error-corrected data from the ECC block is transmitted to the DMA buffer responsive to detection of an error in the data.

In some embodiments, the memory controller may include a plurality of ECC blocks corresponding to respective ones of a plurality of memory devices. An error may be detected in respective data of one of the plurality of memory devices by a corresponding one of the plurality of ECC blocks. In response, the transmission of the respective data to the DMA buffer from the one of the plurality of memory devices corresponding to the one of the plurality of ECC blocks that detected the error may be interrupted, and the error in the respective data from the one of the plurality of memory devices may be corrected to provide respective error-corrected data for the one of the plurality of memory devices. The respective error-corrected data may be transferred to the DMA buffer in place of the respective data from the one of the plurality of memory devices.

In other embodiments, the one of the plurality of ECC blocks may be provided with next data from the corresponding one of the plurality of memory devices after outputting the respective error-corrected data therefrom.

In some embodiments, an error detection signal may be generated in response to detecting the error in the data from the memory device.

In other embodiments, the DMA buffer may be provided with the error-corrected data from the ECC block in response to the error detection signal.

In some embodiments, the DMA buffer may be provided with the data from the memory device when the error detection signal is not received.

According to still further embodiments of the present invention, an ECC control circuit includes a direct memory access (DMA) buffer; a first Error Correcting Code (ECC) block configured to perform error detection and correction for first data read from a first memory device and output first error-corrected data; a second ECC block configured to perform error detection and correction for second data read from a second memory device and output second error-corrected data; and a selector configured to provide the DMA buffer and the first and second ECC blocks with the first and second data read from the first and second memory devices, respectively. The selector is configured to provide the DMA buffer with the first and/or second error-corrected data from the first and/or second ECC blocks in place of the data read from the first and/or second memory devices in response to detection of an error in the first and/or second data.

In some embodiments, the first ECC block may be configured to generate a first error detection signal in response to detection of an error in the first data, and the second ECC block may be configured to generate a second error detection signal in response to detection of an error in the second data.

In other embodiments, the selector may be configured to provide the DMA buffer with the first and/or second error-corrected data from the first and/or second ECC blocks instead of the first and/or second data read from the first and/or second memory devices in response to receiving the first and/or second error detection signals, respectively.

DETAILED DESCRIPTION OF EMBODIMENTS

Figure 1:
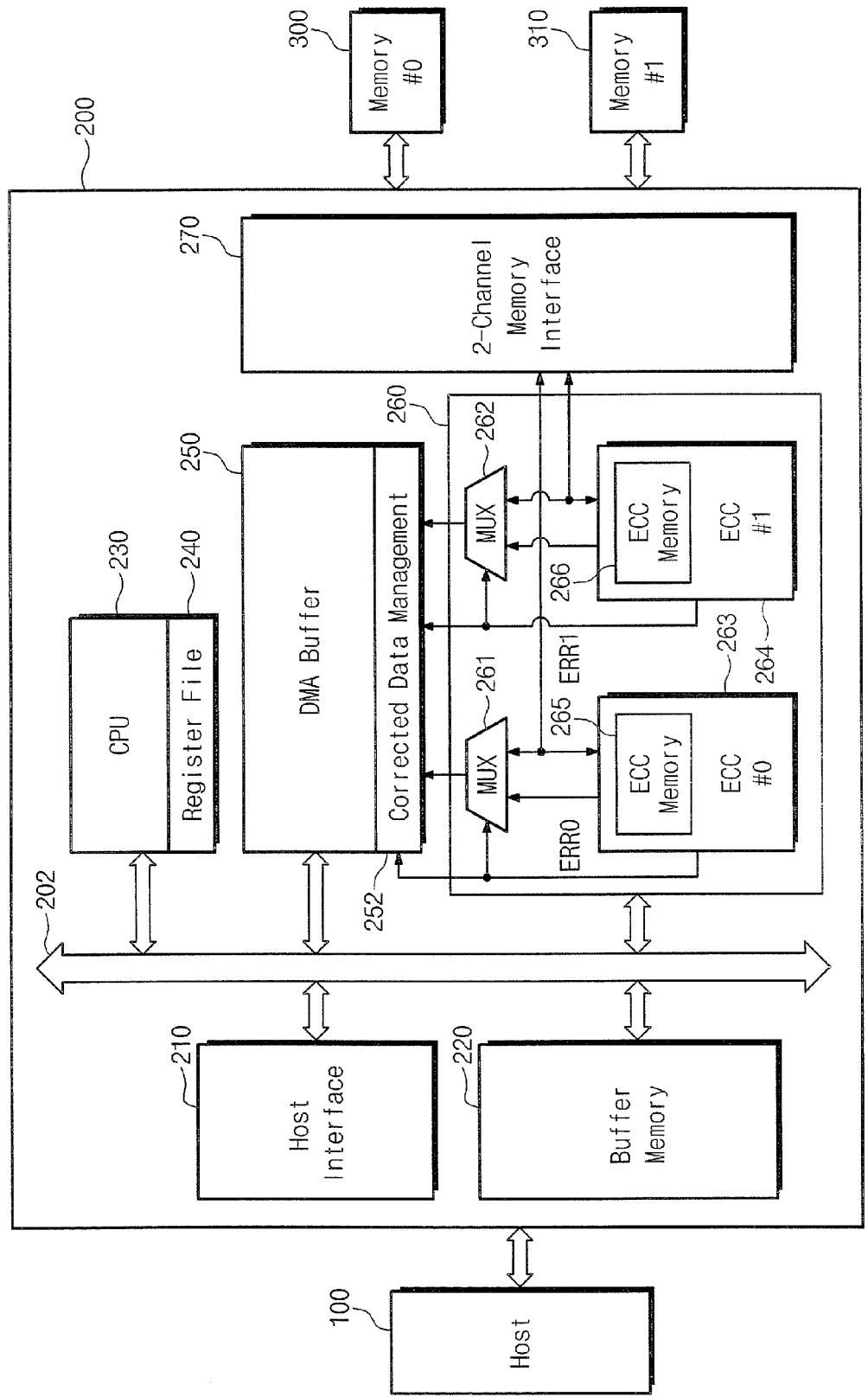
FIG. 1 is a block diagram of a memory system according to some embodiments of the present invention.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity. Like reference numbers refer to like elements throughout.

It will be understood that when an element is referred to as being "on," "connected to" or "coupled to" another element, it can be directly on, connected or coupled to the other element or layer or intervening elements may be present. In contrast, when an element is referred to as being "directly on," "directly connected to" or "directly coupled to" another element, there are no intervening elements present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Some embodiments are described with regard to flowcharts in which each block represents a circuit element, module, or portion of code which includes one or more executable instructions for implementing the specified logical function (s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a memory system according to the present invention. Referring to FIG. 1, the memory system includes a plurality of memory devices 300 and 310, and a memory controller 200. The memory devices 300 and 310 operate under control of the memory controller 200. The memory devices 300 and/or 310 may be hard disks, CD-ROMs, DVDs, and/or flash memories, and need not be the same type. For instance, in some embodiments, the memory devices 300 and 310 may be NAND-flash memory devices. In other embodiments, the memory devices 300 and 310 may be NOR-flash memory devices, phase-changeable memory devices, magnetic RAMs, or other kinds of nonvolatile memories.

The memory controller 200 is configured to control the memory devices 300 and 310 in response to a request by a host 100. The memory controller 200 includes a host interface 210, a buffer memory 220, a central processing unit (CPU) 230, a register file 240, a direct memory access (DMA) buffer 250, an ECC (Error Correcting Code) controller 260, and a memory interface 270. The DMA buffer 250 and the ECC controller 260 may constitute an ECC control circuit. The host interface 210 is configured to provide an interface between the memory controller 200 and the host 100 and the memory interface 270 is configured to provide an interface between the memory controller 200 and the memory devices 300 and 310. The memory interface 270 enables the memory devices 300 and 310 to be accessed in parallel. The CPU 230 is configured to control overall operation of the memory controller 200. The register file 240 includes registers configured to store status information used for operation of the memory controller 200. The host 100 and the memory controller 200 may be configured to communicate with each other by way of various interface types such as NOR-flash, NAND-flash, peripheral component interconnection (PCI), international organization for standardization (ISO), and/or USB. Also, the memory devices 300 and 310 and the memory controller 200 may be configured to communicate with each other using an interface mode suitable for the particular type(s) of the memory devices 300 and 310. For example, if the memory devices 300 and 310 are NAND-flash memories or NOR-flash memories, the memory controller 200 may communicate with the memory devices 300 and 310 using the well-known NAND interface mode or NOR interface mode, respectively.

If the memory devices 300 and 310 are flash memories, the memory controller 200 and the memory devices 300 and 310 may constitute a memory card, e.g., a flash memory card or a smart card. In another embodiment, the memory controller 200 may be disposed on a main board of a personal computer. The memory controller 200 may also function as a buffer controller for a HDD where the flash memory is used as a buffer memory.

The memory devices 300 and 310 and the memory controller 200 may be included in an electronic apparatus such as an MP3 player, a memory stick, MultiMedia card (MMC), a DVD player, a portable multimedia player (PMP), or a mobile phone.

Still referring to FIG. 1, the buffer memory 220 functions to temporarily store data that is received from the host 100 through the host interface 210, and/or data to be transferred into the host 100 from the memory devices 300 and 310. The buffer memory 220 may be a nonvolatile memory, such as a synchronous DRAM. The buffer memory 220 is configured to read and write data in the unit of 512 bytes, i.e., one sector. While the present embodiment is described with reference to a volume or unit sector size of 512 bytes, it is to be understood that other unit sector sizes may be used. The DMA buffer 250 enables data to be stored in the buffer memory 220 from the two memory devices 300 and 310 in a pipeline mode.

The ECC controller 260 is configured to generate error control code data (hereinafter, referred to as 'ECC data') for data to be stored in the memory devices 300 and 310. ECC data is used for error detection and/or correction. The ECC controller 260 is configured to detect and correct errors in data read from the memory devices 300 and 310. In particular, the ECC controller 260 detects errors in data read from the memory devices 300 and 310 through the memory interface 270, and at the same time, provides the read data to the DMA buffer 250. If an error is included in data read from one of the memory devices 300 and 310, the ECC controller 260 interrupts transfer of the erroneous data into the DMA buffer 250 and, after correcting the data, provides error-corrected data to the DMA buffer 250.

As seen from the aforementioned description, the ECC controller 260 according to some embodiments of the present invention operates to reduce latency due to detecting errors in data read from the memory devices 300 and 310 by providing the read data to the DMA buffer 250 at the same time of detecting the error from the read data. In particular, a data read-out time may be shortened if the memory devices 300 and 310 are SLC flash memories, which may have a relatively low error rate.

Further, the ECC controller 260 is configured to provide the error-corrected data to the DMA buffer 250 after correcting erroneous data, without direct access to the buffer memory 220, so it may be possible to prevent a reduction in bus bandwidth due to error detection and correction.

Referring to FIG. 1, the ECC controller 260 includes two multiplexers (or selectors) 261 and 262, and two ECC blocks 263 and 264, respectively corresponding to the two memory devices 300 and 310. The ECC blocks 263 and 264 are configured to generate ECC data to be stored each in the memory devices 300 and 310. The ECC blocks 263 and 264 are also configured to detect and correct errors in data read from the memory devices 300 and 310. The ECC blocks 263 and 264 include ECC memories 265 and 266, respectively.

Figure 2:
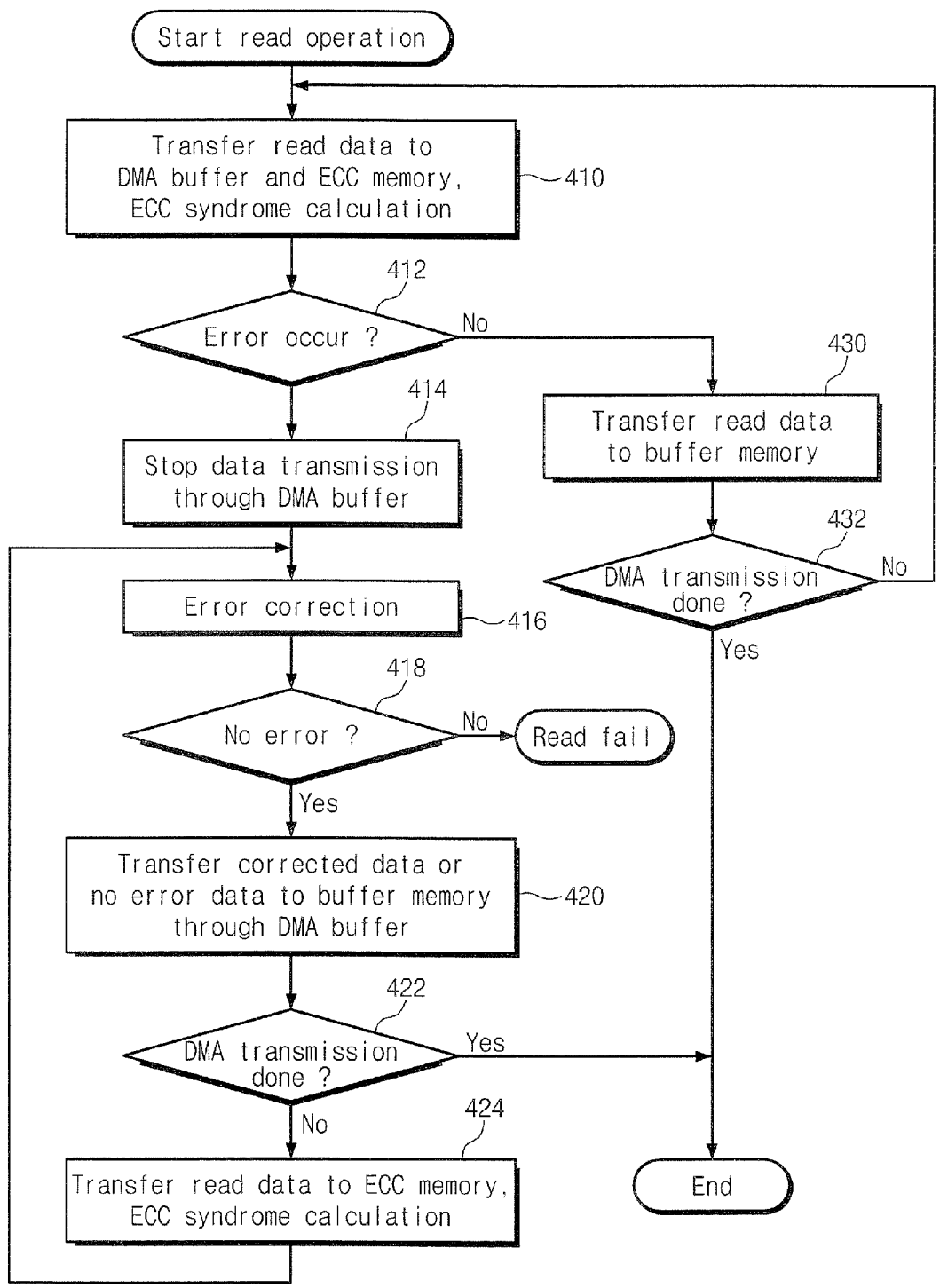
FIG. 2 is a flow chart showing an operation procedure with the ECC controller and DMA buffer of FIG. 1 in accordance with some embodiments of the present invention.

FIG. 2 is a flow chart illustrating operations of the ECC controller 260 and the DMA buffer 250 of FIG. 1 according to some embodiments of the present invention. In particular, when the host 100 requests a data reading from the memory devices 300 and 310, the CPU 230 controls an access operation to the memory devices 300 and 310 and sets a DMA-transmission start bit to the register file 240. Thereby, a DMA transmission mode is conducted to store data from the memory devices 300 and 310 into the buffer memory 220 by way of the DMA buffer 250.

Referring to FIGS. 1 and 2, data read out from the memory device 300 through the memory interface 270 is provided to the multiplexer 261 and the ECC block 263 at the same time (step 410). At the initial time, as an error detection signal ERR0 output from the ECC block 263 is inactive, the multiplexer 261 provides data from the memory device 300 to the DMA buffer 250 via the memory interface 270. The ECC block 263 executes error detection after storing data into the ECC memory 265 from the memory device 300 (step 412). If a bit error is detected in the data read out from the memory device 300, the error detection signal ERR0 is activated. In response to activation of the error detection signal ERR0, the multiplexer 261 interrupts output of the data input via the memory interface 270, and the DMA buffer 250 stops transferring data to the buffer memory 220 from the multiplexer 261 (step 414).

The ECC block 263 corrects errors in the read data (step 416). If it confirms that error correction was successful (step 418), the error-corrected data is provided to the multiplexer 261. While the error detection signal ERR0 is active, the multiplexer 261 transfers the corrected data from the ECC block 263 to the DMA buffer 250 (step 420). The multiplexer 261 continues to transfer the corrected data from the ECC block 263 to the DMA buffer 250 during the DMA transmission mode, even though the error detection signal ERR0 may return to inactive/be deactivated. Therefore, after detecting an error in the data read from the memory device 300, the data from the memory device 300 is stored in the ECC memory 265, transfer of the data to the DMA buffer 250 is interrupted, and the error-corrected data is transferred to the DMA buffer 250 from the ECC block 263 (step 424).

The control steps 410~420 are carried out by the multiplexer 261 and the ECC block 263, and likewise, by the multiplexer 262 and the ECC block 264. More particularly, data read from the memory device 310 through the memory interface 270 is simultaneously provided to the multiplexer 262 and the ECC block 264 (step 410) in parallel. At the initial time, as an error detection signal ERR1 output from the ECC block 264 is inactive, the multiplexer 262 provides data to the DMA buffer 250 from the memory device 310. The ECC block 264 executes error detection (step 412) after storing data into the ECC memory 265 from the memory device 300. If a bit error is detected in the data read out from the memory device 300, the error detection signal ERR1 is activated. In response to activation of the error detection signal ERR1, the multiplexer 262 interrupts output of the data input via the memory interface 270, and the DMA buffer 250 stops transferring the data from the multiplexer 262 to the buffer memory 220 (step 414).

The ECC block 264 corrects errors in the read data (step 416). If it confirms there are no further errors in the data (step 418), the error-corrected data is provided to the multiplexer 262. While the error detection signal ERR1 is active, the multiplexer transfers the corrected data from the ECC block 264 to the DMA buffer 250 (step 420). The multiplexer 262 continues to transfer the corrected data from the ECC block 264 to the DMA buffer 250 during the DMA transmission mode even if the error detection signal ERR1 returns to inactive/is deactivated. Therefore, after detecting an error in the data read from the memory device 310, the data from the memory device 310 is stored in the ECC memory 266, transfer of the data to the DMA buffer 250 is interrupted, and the corrected data is transferred to the DMA buffer 250 from the ECC block 264 (step 424).

A corrected-data manager 252 transfers data to the buffer memory 220 (step 430) if the error detection signals ERR0 and ERR1 are not received/inactivated responsive to receiving the data through the multiplexers 261 and 262. The corrected data manager 252 does not transfer the data to the buffer memory 220 if a corresponding one of the error detection signals ERR0 and ERR1 is active. Moreover, even if an active error detection signal is later deactivated, the corrected-data manager 252 continues to transfer the error-corrected data to the buffer memory 220. In other words, once an error detection signal has been received, the corrected data manager 252 (and/or the corresponding selectors 261/262) continues to provide the error-corrected data from the respective ECC blocks 263 and/or 264 until transmission of the unit of data in which the error was detected has been completed.

Once the data from one sector has been read from the memory devices 300 and/or 310 and has been transferred to the buffer memory 220 through the DMA buffer 250 (steps 422 and 430), the ECC operation is terminated by the ECC controller 260.

As can be seen from the description above, when the error detection signals are inactive, the multiplexers 261 and/or 262, transfer data to the DMA buffer 250 from the memory device 300 and/or 310 corresponding thereto. Therefore, when errors are not detected in one-sector of data, data read from the memory devices 300 and 310 can be transferred to the DMA buffer 250 without the latency introduced by error detection and/or correction. Even when errors are detected in the data of the memory devices 300 and 310, corrected data is transferred to the buffer memory 220 through the DMA buffer 250, not through the bus 202. Therefore, a reduction in bus bandwidth due to bus occupation by the ECC controller 260 may be reduced and/or prevented.

Figure 3:
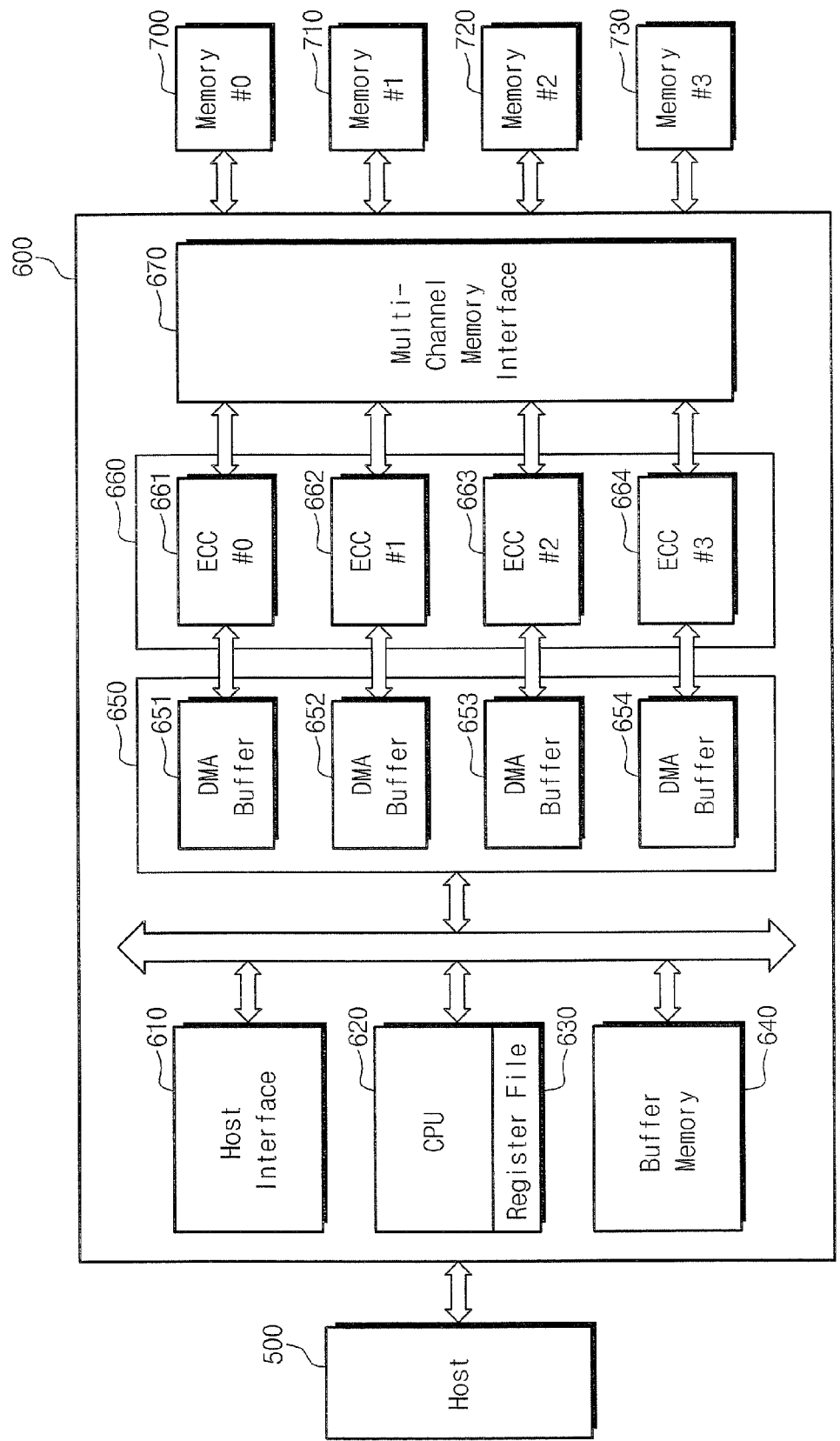
FIG. 3 is a block diagram of a multi-channel memory system according to other embodiments of the present invention.

FIG. 3 is a block diagram of a multi-channel memory system (e.g., 4-channel type) according to other embodiments of the present invention.

Referring to FIG. 3, the 4-channel memory system includes four memory devices 700, 710, 720, and 730 coupled to a memory controller 600. The memory controller 600 operates to control the memory devices 700~730 in response to a request by a host 500. The memory controller 600 includes a host interface 610, a CPU 620, a register file 630, a buffer memory 640, a DMA buffer block 650, an ECC controller 660, and a memory interface 670. The host interface 610 is provided as an interface between the memory controller 600 and the host 500, and the memory interface 670 is provided as an interface between the memory controller 600 and the memory devices 700~730. The memory interface 670 is configured to access the memory devices 700~730 in parallel.

As shown in FIG. 3, the DMA buffer block 650 includes DMA buffers 651, 652, 653, and 654 respectively corresponding to the memory devices 700, 710, 720, and 730. The ECC controller 660 includes ECC blocks 661, 662, 663, and 664 respectively corresponding to the memory devices 700, 710, 720, and 730.

Each of the ECC blocks 661~664 is configured to detect errors in the data of its corresponding memory device, while the data is simultaneously transferred to the DMA buffer corresponding thereto. The DMA buffer block 650 transfers data to the buffer memory 640 from the ECC blocks 661~664 of the ECC controller 660 in the pipeline mode. When an error is detected the data, the corresponding DMA buffer transfers error-corrected data from the corresponding one of the ECC blocks 661~664 to the buffer memory 640, in place of the error-detected data.

Figure 4:
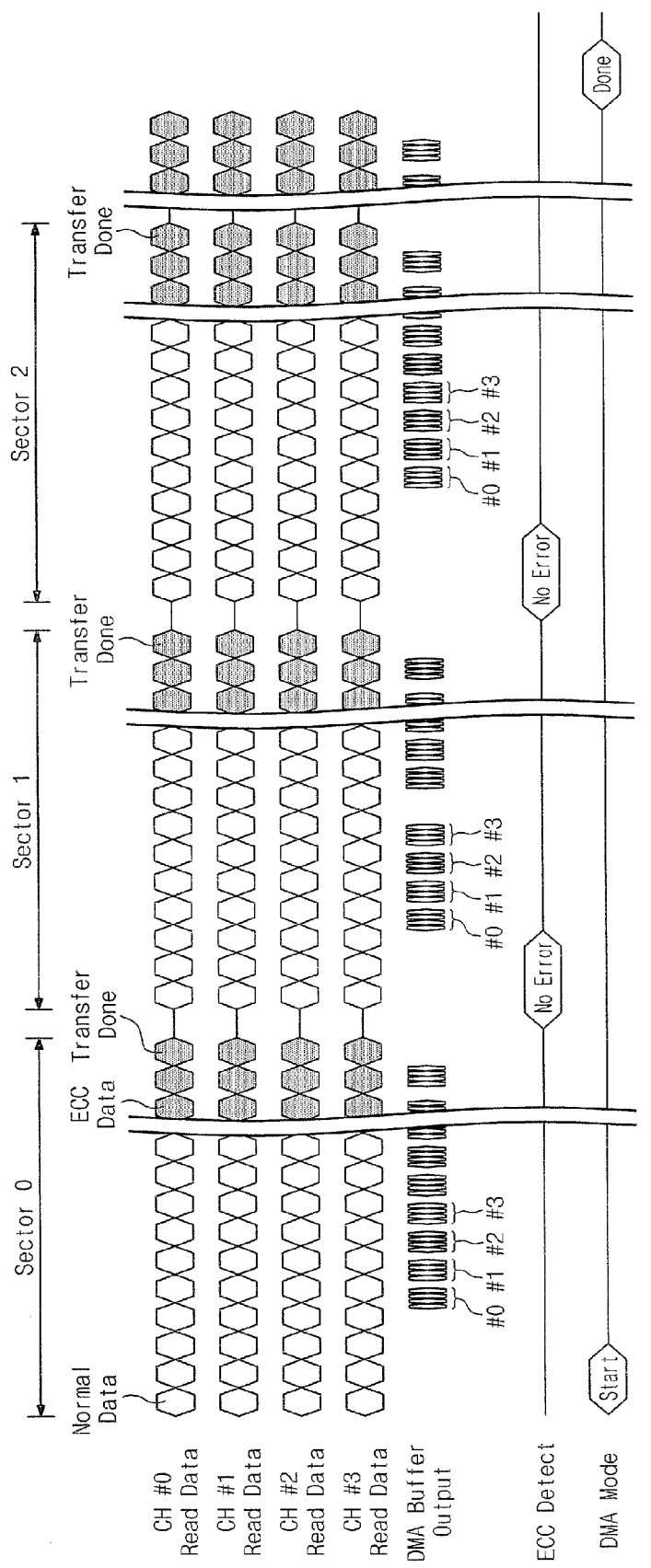
FIG. 4 is a timing diagram showing patterns of data read from the memory devices and output data of the DMA buffer block if there is no error during the DMA transmission mode in the 4-channel memory system shown in FIG. 3.

FIG. 4 is a timing diagram showing data read from the memory devices and output data of the DMA buffer block 650 in the case where there are no errors during the DMA transmission mode in the 4-channel memory system shown in FIG. 3. Referring to FIG. 4, the DMA transmission mode begins when the host 500 requests data from the memory devices 700~730 for reading. Data read from the memory devices 700~730 contains original (or "normal") data and ECC data. In other words, one-sector data includes original data and ECC data. Data read from the memory devices 700~730 are stored in the DMA buffers 651~654 through the ECC blocks 661~664. If no errors are detected by the ECC blocks 661~664, the data stored in the DMA buffers 651~654 are transferred to the buffer memory 640. In particular, burst data with n bytes (where n is a positive integer) are alternately output in sequence from the DMA buffers 651~654 of the DMA buffer block 650. If data requested by the host 100 are all output from the memory devices 700~730, the DMA transmission mode is terminated.

Figure 5:
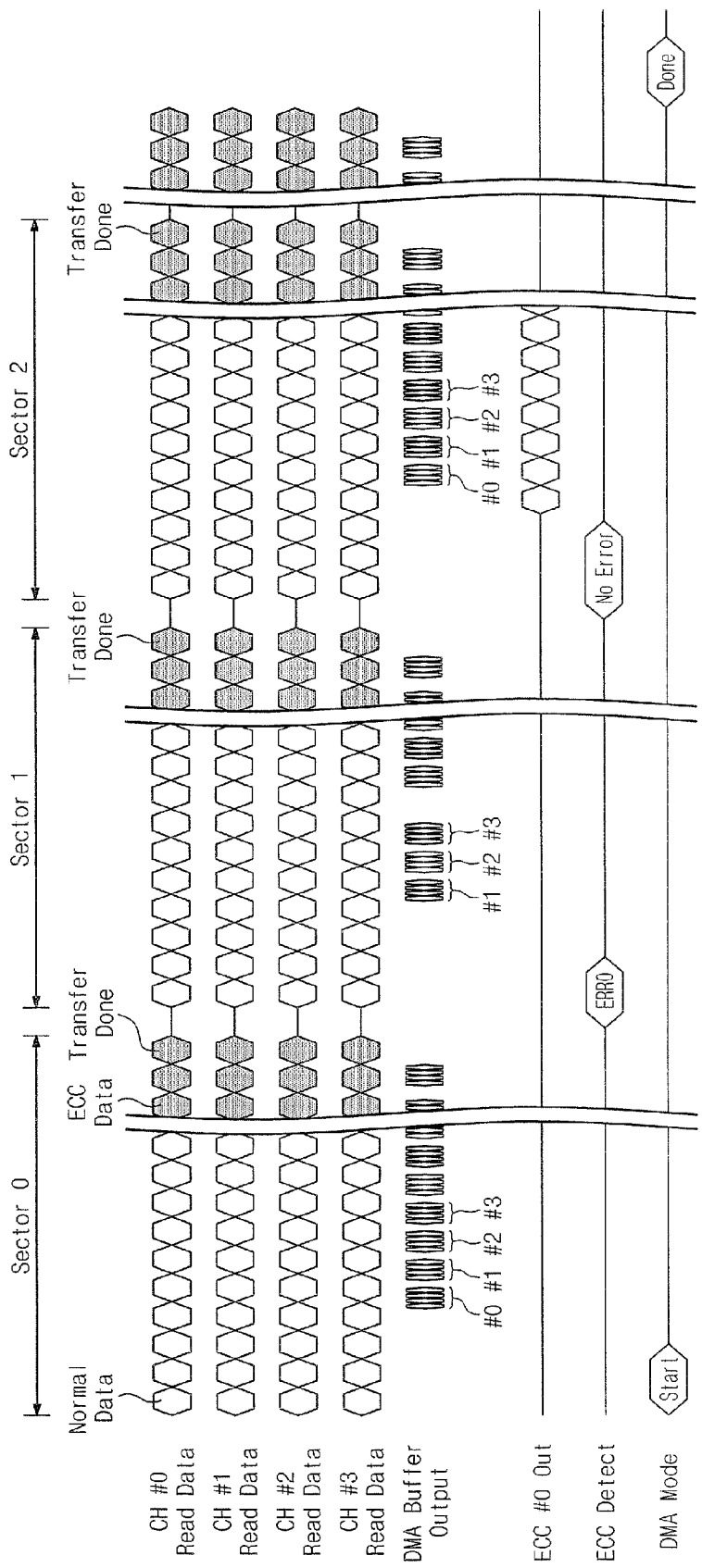
FIG. 5 is a timing diagram showing data read from the memory devices and output data of the DMA buffer block if there is detected an error during the DMA transmission mode in the 4-channel memory system shown in FIG. 3.

FIG. 5 is a timing diagram showing data read from the memory devices and output from the DMA buffer block 650 if an error is detected during the DMA transmission mode in the 4-channel memory system shown in FIG. 3. Referring to FIG. 5, the DMA transmission mode begins when the host 100 requests data from the memory devices 700~730 for reading. Data read from the memory devices 700~730 are stored in the DMA buffers 651~654 through the ECC blocks 661~664 respectively. If the ECC block 661 confirms error detection, the data stored in the DMA buffers 652~654 are transferred to the buffer memory 640 and the ECC block 661 executes error correction.

Thereafter, the DMA buffer 651 receives data corrected by the ECC block 661, and transfers the error-corrected data to the buffer memory 640. During this, the DMA buffer 651 independently manages an address of the buffer memory 640 in which the error-corrected data is to be stored.

As illustrated in FIG. 5, if an error is detected in the data from the first sector #0 (e.g., the first channel CH #0 of the first sector), by the ECC block 661, data from the second to fourth channels (CH #1~CH #3) of the first sector are transferred to the DMA buffer block 650, and, the ECC block 661 corrects the detected error. The error-corrected data of the first sector (CH #0), which is output from the ECC block 661, is transferred to the buffer memory 640 along with data of the second through fourth channels. After reading out data requested by the host 100 from the memory devices 700~730, the DMA transmission mode is terminated.

While the embodiments of FIGS. 3-5 are described with reference to a 4-channel memory system, it will be readily understood by those skilled in the art that the present invention is also applicable to a 2-channel memory system and/or memory systems including fewer or greater numbers of channels.

According to embodiments of the present invention, the ECC control circuit (or the ECC controller) operates to reduce latency due to error detection for data read out from the plurality of memory devices by detecting errors from the data of the memory devices at the same time as providing the data to the DMA buffer. The ECC control circuit provides error-corrected data to the DMA buffer after correcting erroneous data, without direct access to the buffer memory, thereby preventing possible reduction in bus bandwidth that may be caused by error detection and/or correction.

In the drawings and specification, there have been disclosed exemplary embodiments of the invention. However, many variations and modifications can be made to these embodiments without substantially departing from the principles of the present invention. Accordingly, although specific terms are used, they are used in a generic and descriptive sense only and not for purposes of limitation, the scope of the invention being defined by the following claims.

That which is claimed:

1. An Error Correcting Code (ECC) control circuit in a memory controller, comprising:
   an ECC controller configured to receive data from a memory device in response to a request from a host device and transmit the data, in parallel, to a direct memory access (DMA) buffer for transfer to the host device and to an ECC block for error detection and correction of the data,
   wherein the ECC controller is configured to interrupt transmission of the data to the DMA buffer and transmit error-corrected data output from the ECC block to the DMA buffer responsive to detection of an error in the data by the ECC block.

2. The ECC control circuit of claim 1, wherein the ECC controller comprises:
   a plurality of ECC blocks corresponding to respective ones of a plurality of memory devices and configured to perform error detection and correction of respective data read from the corresponding ones of the plurality of memory devices; and
   a plurality of selectors corresponding to respective ones of the plurality of ECC blocks and configured to provide the respective data read from the corresponding ones of the plurality of memory devices to the DMA buffer and to the corresponding ones of the plurality of ECC blocks in parallel,
   wherein each of the plurality of selectors is configured to provide the DMA buffer with respective error-corrected data from the corresponding one of the plurality of ECC blocks in place of the respective data from the corresponding one of the plurality of memory devices in response to receiving an error detection signal from the corresponding one of the plurality of ECC blocks.

3. The ECC control circuit of claim 1, wherein the ECC block is configured to generate an error detection signal responsive to detection of the error in the data from the memory device.

4. The ECC control circuit of claim 3, wherein the ECC controller further comprises:
   a selector configured to provide the DMA buffer with the error-corrected data from the ECC block in response to the error detection signal.

5. The ECC control circuit of claim 4, wherein the selector is configured to provide the DMA buffer with the data from the memory device when the error detection signal is not received.

6. The ECC control circuit of claim 4, wherein the ECC block comprises an ECC memory configured to store the data from the memory device.

7. The ECC control circuit of claim 6, wherein the ECC block is configured to perform error correction on the data stored in the ECC memory and output the error-corrected data to the selector responsive to detection of the error in the data.

8. The ECC control circuit of claim 1, wherein the ECC block is further configured to output information including error location and/or status responsive to detection of the error in the data.

9. A memory system comprising:
   a plurality of memory devices; and
   a memory controller configured to provide an interface between the plurality of memory devices and a host device, wherein the memory controller comprises:
   a buffer memory;
   a direct memory access (DMA) buffer configured to transfer data to the buffer memory;
   a plurality of Error Correcting Code (ECC) blocks corresponding to respective ones of the plurality of memory devices and configured to perform error detection and correction of respective data read from the corresponding ones of the plurality of memory devices and output respective error detection signals and respective error-corrected data; and
   a plurality of selectors corresponding to respective ones of the plurality of ECC blocks and configured to provide the respective data from the corresponding ones of the plurality of memory devices to the DMA buffer and to the corresponding ones of the plurality of ECC blocks in parallel, wherein each of the plurality of selectors is configured to provide the DMA buffer with the respective error-corrected data from the corresponding one of the plurality of ECC blocks in place of the respective data from the corresponding one of the plurality of memory devices in response to receiving the respective error detection signal from the corresponding one of the plurality of ECC blocks.

10. The memory system of claim 9, wherein each of the plurality of ECC blocks is configured to generate the respective error detection signal responsive to detection of an error in the respective data from the corresponding one of the plurality of memory devices.

11. The memory system of claim 10, wherein each of the plurality of ECC blocks is configured to correct the error in the respective data from the corresponding one of the plurality of memory devices based on respective ECC data included in the respective data from the corresponding one of the plurality of memory devices.

12. The memory system of claim 11, wherein each of the plurality of selectors is configured to provide the DMA buffer with the respective error-corrected data output from the corresponding one of the plurality of ECC blocks in response to the respective error detection signal output therefrom.

13. The memory system of claim 12, wherein each of the plurality of selectors is configured to provide the DMA buffer with the respective error-corrected data output from the corresponding one of the plurality of ECC blocks in response to the respective error detection signal output therefrom until transmission of the respective data including the error therein is completed.

14. The memory system of claim 13, wherein the DMA buffer is configured to receive the respective data from the plurality of selectors and the respective error detection signals from the plurality of ECC blocks, and is configured to transfer the respective data to the buffer memory when the respective error detection signals are not received from the corresponding ones of the plurality of ECC blocks.

15. The memory system of claim 12, wherein the DMA buffer comprises a manager configured to transfer the respective error-corrected data from the plurality of selectors to the buffer memory in response to the respective error detection signal.

16. The memory system of claim 9, further comprising:
a memory interface coupled to the plurality of ECC blocks and configured to interface with the plurality of memory devices.

17. The memory system of claim 9, wherein each of the plurality of ECC blocks respectively comprise an ECC memory configured to store the data from the corresponding one of the plurality of memory devices.

18. The memory system of claim 17, wherein each ECC block is configured to perform error correction for the respective data stored in the respective ECC memory in response to detection of an error in the respective data from the corresponding one of the plurality of memory devices and output the respective error-corrected data.

19. The memory system of claim 9, wherein each ECC block is further configured to output respective information including error position and/or status to the DMA buffer in response to detection of an error in the data from the corresponding one of the plurality of memory devices.

20. The memory system of claim 19, wherein the DMA buffer comprises a manager configured to transfer the respective error-corrected data from the plurality of selectors to the buffer memory in response to the respective error detection signal and based on the respective information including error position and/or status.

21. A method for correcting errors in data transmission, the method comprising:
receiving data from a memory device in response to a request from a host device;
transmitting the data, in parallel, to a direct memory access (DMA) buffer for transfer to the host device and to an Error Correcting Code (ECC) block for error detection and correction of the data; and
interrupting transmission of the data from the memory device to the DMA buffer and transmitting error-corrected data from the ECC block to the DMA buffer responsive to detection of an error in the data.

22. The method of claim 21, wherein the memory controller comprises a plurality of ECC blocks corresponding to respective ones of a plurality of memory devices, and wherein interrupting transmission of the data comprises:
detecting an error in respective data of one of the plurality of memory devices by a corresponding one of the plurality of ECC blocks;
interrupting the transmission of the respective data to the DMA buffer from the one of the plurality of memory devices corresponding to the one of the plurality of ECC blocks that detected the error;
correcting the error in the respective data from the one of the plurality of memory devices to provide respective error-corrected data for the one of the plurality of memory devices; and
transferring the respective error-corrected data to the DMA buffer in place of the respective data from the one of the plurality of memory devices.

23. The method of claim 22, further comprising:
providing the one of the plurality of ECC blocks with next data from the corresponding one of the plurality of memory devices after outputting the respective error-corrected data therefrom.

24. The method of claim 21, further comprises:
generating an error detection signal in response to detecting the error in the data from the memory device.

25. The method of claim 24, wherein interrupting transmission of the data comprises:
providing the DMA buffer with the error-corrected data from the ECC block in response to the error detection signal.

26. The method of claim 25, further comprising:
providing the DMA buffer with the data from the memory device when the error detection signal is not received.

27. An ECC control circuit, comprising:
a direct memory access (DMA) buffer;
a first Error Correcting Code (ECC) block configured to perform error detection and correction for first data read from a first memory device and output first error-corrected data;
a second ECC block configured to perform error detection and correction for second data read from a second memory device and output second error-corrected data; and
a selector configured to provide the DMA buffer and the first and second ECC blocks with the first and second data read from the first and second memory devices, respectively, in parallel,
wherein the selector is configured to provide the DMA buffer with the first and/or second error-corrected data from the first and/or second ECC blocks in place of the data read from the first and/or second memory devices in response to detection of an error in the first and/or second data.

28. The ECC control circuit of claim 27, wherein the first ECC block is configured to generate a first error detection signal in response to detection of an error in the first data, and wherein the second ECC block is configured to generate a second error detection signal in response to detection of an error in the second data.

29. The ECC control circuit of claim 28, wherein the selector is configured to provide the DMA buffer with the first and/or second error-corrected data from the first and/or second ECC blocks instead of the first and/or second data read from the first and/or second memory devices in response to receiving the first and/or second error detection signals, respectively.

* * * * *